(12) United States Patent
Wolf

(10) Patent No.: US 7,292,934 B2
(45) Date of Patent: Nov. 6, 2007

(54) NAVIGATION SYSTEM FOR A VEHICLE

(75) Inventor: Juergen Wolf, Villingen-Schwenningen (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 11/000,982

(22) Filed: Dec. 2, 2004

(65) Prior Publication Data

US 2005/0197764 A1 Sep. 8, 2005

Related U.S. Application Data

(63) Continuation of application No. PCT/DE03/01722, filed on May 27, 2003.

(30) Foreign Application Priority Data

Dec. 6, 2002 (DE) .............................. 102 26 084

(51) Int. Cl.
*G01C 21/26* (2006.01)
(52) U.S. Cl. ...................... 701/117; 701/119
(58) Field of Classification Search .............. None
See application file for complete search history.

(56) References Cited

U.S. PATENT DOCUMENTS

| | | | | |
|---|---|---|---|---|
| 5,257,023 A | * | 10/1993 | Furuya ................. 340/995.13 |
| 5,289,183 A | * | 2/1994 | Hassett et al. .............. 340/905 |
| 5,948,040 A | * | 9/1999 | DeLorme et al. ........... 701/201 |
| 5,987,374 A | * | 11/1999 | Akutsu et al. .............. 701/117 |
| 6,078,895 A | * | 6/2000 | Ryu et al. ...................... 705/13 |
| 6,092,020 A | * | 7/2000 | Fastenrath et al. .......... 701/119 |
| 6,150,961 A | * | 11/2000 | Alewine et al. ......... 340/995.1 |
| 6,480,783 B1 | * | 11/2002 | Myr ............................ 701/117 |
| 6,594,576 B2 | * | 7/2003 | Fan et al. .................... 701/117 |
| 2001/0027373 A1 | * | 10/2001 | Bates et al. ................. 701/117 |

FOREIGN PATENT DOCUMENTS

| | | |
|---|---|---|
| DE | 4034681 A1 | 5/1992 |
| DE | 198 16 967 C1 | 4/1999 |
| DE | 198 28 161 A1 | 12/1999 |
| DE | 19903909 A1 | 8/2000 |
| WO | WO 03/060429 A1 | 7/2003 |

* cited by examiner

*Primary Examiner*—Michael J. Zanelli

(57) ABSTRACT

A navigation system for a vehicle has an evaluation unit for capturing and conditioning vehicle data and/or topographical data. A transmission unit is coupled to the evaluation unit for sending the data captured by the evaluation unit or derived therefrom to navigation systems in other vehicles. A reception unit receives vehicle data and/or topographical data or data derived therefrom from navigation systems in other vehicles. A processing unit is coupled to the reception unit for logically combining and conditioning the data provided by the navigation systems in other vehicles. An output unit outputs the logically combined and conditioned data. The evaluation unit assigns a respective covered path range a numerical value which represents current traffic conditions over this path range, wherein a positive numerical value corresponds to a section on which driving is easy and a negative numerical value signifies poor traffic conditions.

7 Claims, 3 Drawing Sheets

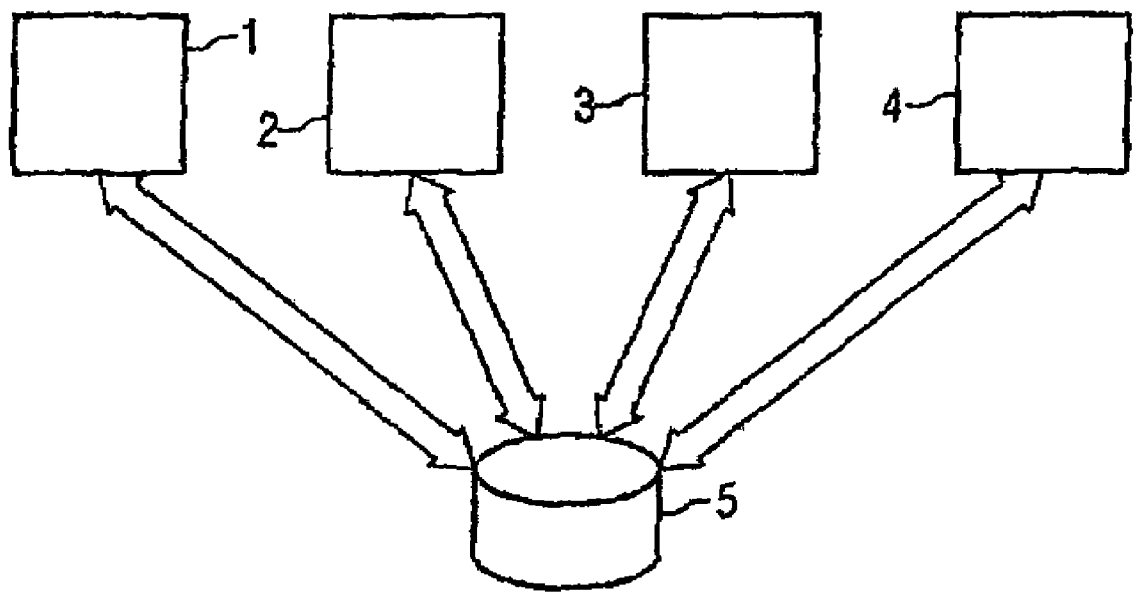
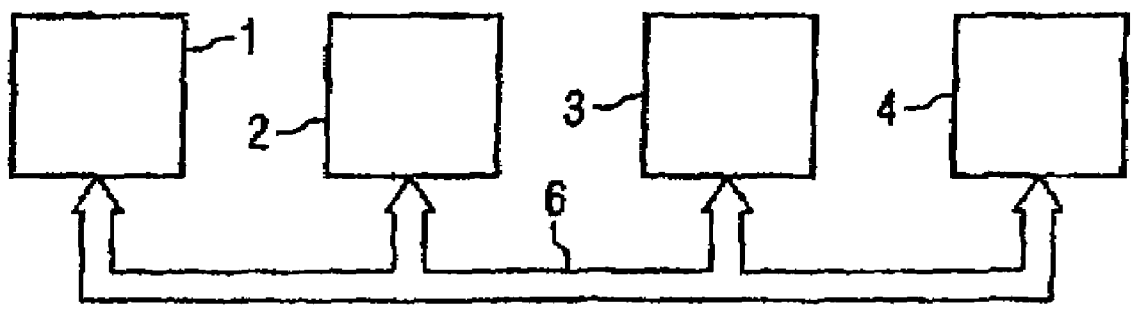

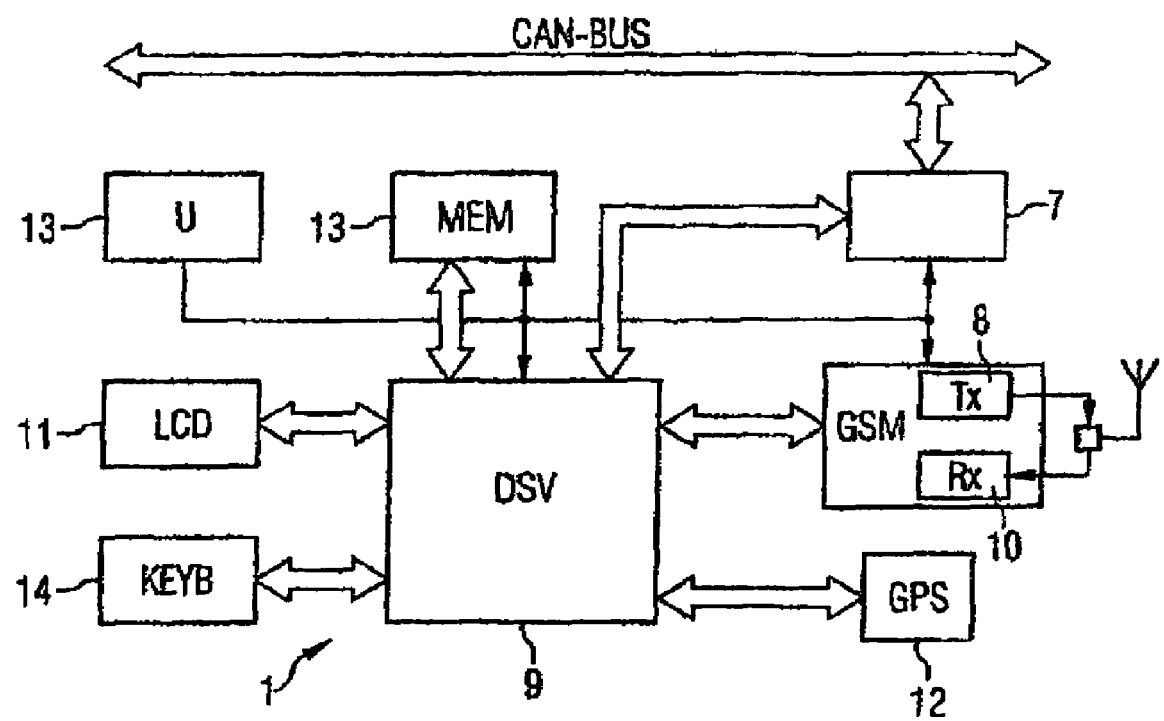

NAVIGATION SYSTEM FOR A VEHICLE

CROSS REFERENCE TO RELATED APPLICATIONS

The present application is a continuation of international application PCT/DE03/01722, filed May 27, 2003 which designated the United States, and claims priority to German application 10226084.2, filed Jun. 12, 2002, the both of which are herein incorporated by reference.

BACKGROUND OF THE INVENTION

The present invention relates to a navigation system for a vehicle comprising an evaluation unit for capturing and conditioning vehicle data and/or topographical data, a transmission unit, which is coupled to the evaluation unit, for sending the data captured by the evaluation unit or derived therefrom to navigation systems in other vehicles, a reception unit for receiving vehicle data and/or topographical data or data derived therefrom from navigation systems in other vehicles, a processing unit which is coupled to the reception unit for the purpose of logically combining and conditioning the data provided by the navigation systems in other vehicles, and an output unit for outputting the logically combined and conditioned data, which is coupled to the processing unit.

Navigation systems are normally used to show the driver of a motor vehicle the path of travel from a starting point to a destination. In this context, the navigation system normally stores an electronic map. In addition, means are provided for the purpose of continually ascertaining the current position of the vehicle. For this, a GPS (Global Positioning System) is normally fitted in the vehicle.

To be able to react to current events during route planning, such as roadworks, congestion information, accidents etc, it is useful to provide the navigation system in the motor vehicle with such, current congestion information. This may be done by using the car radio, for example, to receive current congestion information in digitized form from a broadcast radio station and to supply it to the navigation system. In order to obtain information about the current flow of traffic, it is possible to use stationary congestion indicators. These stationary congestion indicators are mounted on motorway bridges, for example. The congestion information obtained in this manner is gathered and is input into the vehicle's navigation system. Taking economic considerations into account, stationary congestion indicators of this type will be set up only at sites which are at risk of congestion anyway or along sections of the motorway network which carry a lot of traffic, however.

The fundamental drawback of such systems is that areas with a small population or with a weak infrastructure, for example in developing countries, cannot be equipped with stationary congestion indicator networks in consideration of cost aspects.

DE-4034681-A1 discloses, in this regard, a system for transmitting traffic or operating information between vehicles, in which each vehicle records at least the speed of travel and the location of the vehicle in question and locations of other vehicles and transmits them to other passing vehicles. At the same time, the system receives information from the passing vehicles, processes it and shows the processed information on a display device.

DE-19903909-A1 describes a method for dynamically obtaining relevant traffic information and for optimizing a route for a vehicle, in which data are created and sent on the basis of the vehicle's own sensors and the data from other vehicles are received. Data from other vehicles may be requested specifically.

SUMMARY OF THE INVENTION

It is an object of the present invention to specify a navigation system for a vehicle which operates independently of the presence of stationary congestion indicator systems, can be implemented with little complexity and can provide the driver with current traffic or road information.

The invention achieves the object by means of a navigation system of the type mentioned at the outset, in which the evaluation unit assigns a respective covered path range a numerical value which represents the current traffic conditions over this path range, with a positive numerical value corresponding to a section on which driving is easy and a negative numerical value signifying poor traffic conditions.

In this way, the volume of data to be sent to other navigation systems is reduced.

Vehicle data and/or topographical data are understood to mean data which have an information content which is meaningful to other vehicles or vehicle drivers during route planning. These data are accordingly dependent on the road on which the vehicle is currently located and/or the traffic or ambient conditions on that road. They include, by way of example, road data such as the height of passes, the average speed attained, inclines and dips, the level of ice cover on the road surfaces, maximum permissibly height, roadworks, etc.

These data may be taken from a vehicle data bus system, for example. This in turn may be provided with the data from inclination sensors, tachometers and other sensor devices fitted in the vehicle.

The present principle is based on the idea that the navigation system in the vehicle itself captures and conditions vehicle or road data and sends the data captured and conditioned in this manner to navigation systems in other vehicles.

Accordingly, the navigation systems in the vehicles gather vehicle data or road data, from which congestion information may be derived, for example, for themselves and for the other navigation systems and provide the other navigation systems with the data. The navigation system in turn receives this path-dependent, traffic-dependent, environment-dependent or topography-dependent information provided by other navigation systems in other vehicles and can thus provide the driver, during route planning, with reliable and current information about which route leading to the desired destination is the route which is currently best in terms of time or consumption.

The system described may thus operate totally independently of congestion indicators installed at a fixed location and is also not reliant on the manual sending of congestion information by other drivers, for example by radio or telephone.

The navigation system described is accordingly particularly suitable for areas with a small population and/or areas with a weak infrastructure. In particular, provision is made for the use of the navigation system in developing countries.

The vehicle data and/or topographical data preferably comprise the current speed and/or the average speed of the vehicle in which the navigation system is fitted, and the numerical values are accordingly speed-dependent values.

If the average speed or the current speed is very low, for example, then it may be assumed that the vehicle is currently in a traffic jam.

Since the electronic bus systems in modern vehicles are used to capture and gather a great deal of information, for example about the engine, transmission, shock absorbers, inclination etc, this information may preferably be used to pass on information about the road situation, for example about the nature of the road covering, the suitability for transporting dangerous goods or transporting particularly fragile or shock-sensitive goods etc.

The evaluation unit may provide the road section covered with a positive speed marker, for example if the vehicle has progressed quickly in the flow of traffic. When the traffic is being held up, on the other hand, this sluggish traffic is documented with a correspondingly negative value. In this context the evaluation unit is preferably designed such that idle times, refueling stops etc., are taken into account as appropriate. A suitable starting point and destination for path ranges is, by way of example, nodes on an electronic map, which result from junctions or forks in main roads, or capital cities.

A further preference is that the speed value associated with a covered path range is provided with a time stamp and is sent to the navigation systems in the other vehicles in this manner. Using the time stamp, it is possible to weight different good and poor markers, which are sent to the present navigation system by other vehicles, on the basis of their currency and/or to replace older information with more recent information. In addition, it is possible to stipulate expiry times, for example, after which information sent has become worthless. It is also possible to ascertain trends regarding whether a queue is still becoming longer or is already dispersing again.

The evaluation unit preferably assigns the speed-dependent value to a path section on an electronic map.

Hence, in order to carry out route planning from a starting point to a destination, there is no difficulty in assembling a plurality of subsections, which are each provided with speed-dependent values, to give a preferred route.

In line with one preferred embodiment of the invention, a means for finding the position of the vehicle is provided and is coupled to the transmission unit for the purpose of sending the position of the vehicle. Position finding can be performed using a global satellite positioning system, for example, the "GPS". This simplifies the operation of assigning the captured data to a particular subsection on an electronic map.

For the purpose of inputting a desired travel destination, the navigation system is preferably equipped with an input unit. To allow ergonomic operation by the vehicle driver, the input unit is preferably in the form of a multifunction pushbutton switch.

The output unit preferably comprises a graphical display. This graphical display can be used to show speed-dependent values sent by other vehicles, for example in color-coded form, on an electronic map in order to provide the driver with a rapid overview of the current traffic situation and congestion situation.

The vehicle in which the navigation system is provided is preferably a commercial vehicle. The present principle is advantageously shown to its best advantage particularly in commercial vehicles, since these normally have to move also in areas with a weak infrastructure while observing delivery and pickup deadlines.

It goes without saying that the principle may also be used to advantage in personal transport, for example by taxi groups, buses etc.

The transmission unit and the reception unit are preferably designed for satellite radio. The data transmission is thus ensured independently of a locally provided mobile radio network. Alternatively or in addition to a satellite radio module, the navigation system may also comprise a mobile radio transmission and reception module.

Further details and advantageous refinements of the invention can be found in the subclaims.

BRIEF DESCRIPTION OF THE SEVERAL VIEWS OF THE DRAWINGS

The invention is explained in more detail below using a plurality of exemplary embodiments with reference to the drawings, in which:

FIG. 1 shows a first exemplary embodiment of a network, formed by a plurality of navigation systems, with a central structure, FIG. 2 shows a second exemplary embodiment of a network, formed by a plurality of navigation systems, with a decentralized structure, FIG. 4 shows an exemplary embodiment of an inventive navigation system using a highly simplified block diagram.

DETAILED DESCRIPTION OF THE INVENTION

Figure 3:
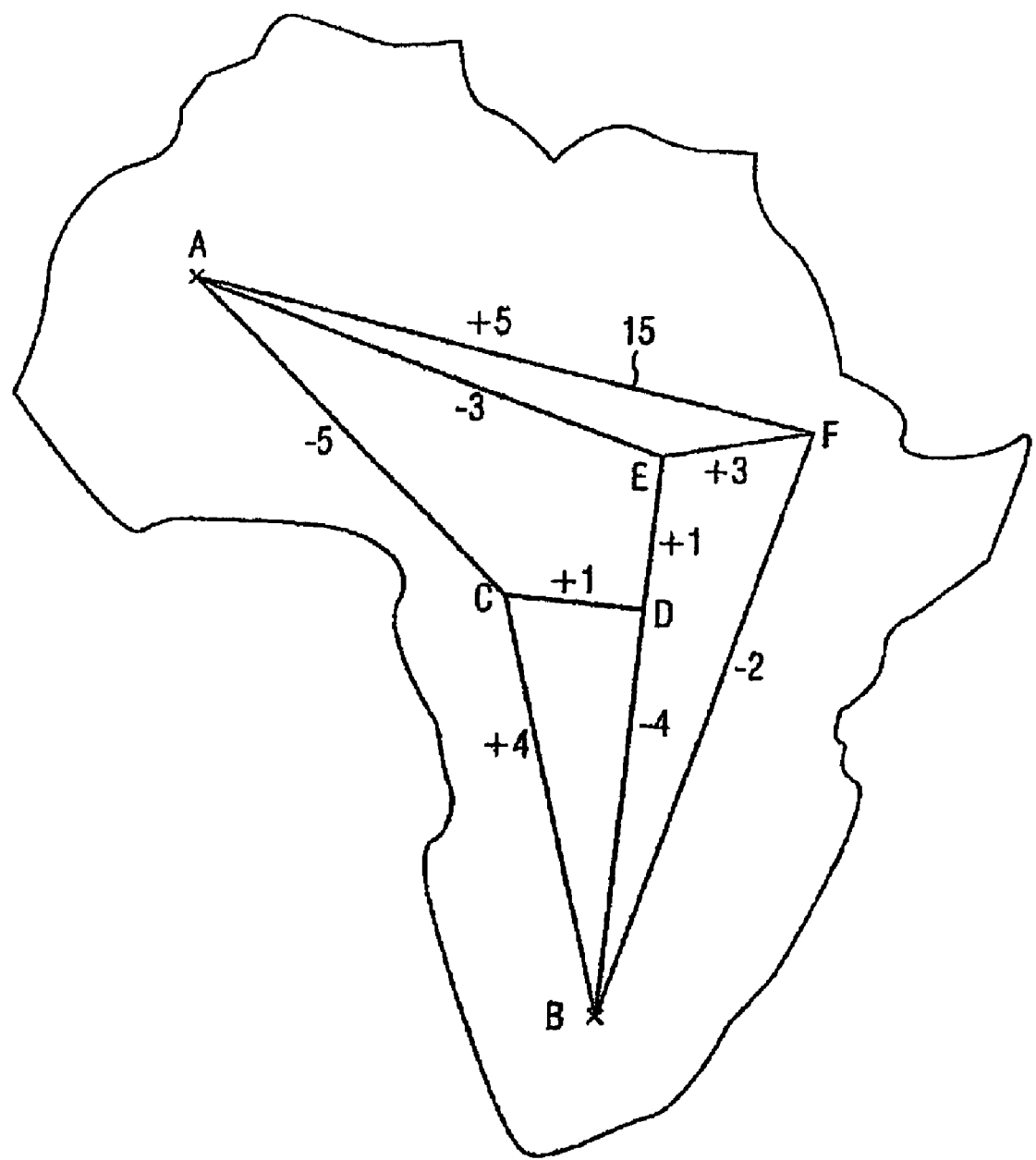
FIG. 3 shows an example of a simplified, graphical display of an electronic map, in which subsections are assessed in terms of the flow of traffic on the basis of the present principle.

FIG. 1 uses a simplified block diagram to show the principle of the inventive navigation system using the example of a centralized network structure. By way of example, four navigation systems 1, 2, 3, 4 are provided which are respectively fitted in different vehicles. The navigation systems 1 to 4 are each coupled to a central server 5 via a bidirectional transmission channel. In this case, the bidirectional transmission channels are preferably in the form of satellite radio links.

The central server 5 gathers topographical and vehicle data or data derived therefrom, namely the average speed at which the vehicle is moving, from the navigation systems 1 to 4. This information is made available to the vehicle navigation system by a data bus in the vehicle. In this case, only the current values respectively associated with the path ranges covered, which values are speed-dependent, are captured and evaluated. These are logically combined with one another and with an electronic map stored on the central server 5. In this case, the speed-dependent values are respectively stored after having been provided with a time stamp.

If one of the navigation systems 1 to 4 now requests a query regarding the fastest possible path from a starting point A to a destination B from the central server 5, the latter assembles the appropriate data on the basis of the traffic situations sent and provides them for retrieval by the querying navigation system. It is thus possible to take into account traffic congestion, roads closed on account of roadworks, closed mountain passes etc., on the basis of latest information, without this requiring congestion indicators in fixed locations.

Accordingly, in accordance with the present principle, the navigation systems which are able to perform route planning weighted with the current traffic situation, gather the information (on which this route planning is based) abut the volume of traffic themselves. It is also in line with the present principle that said principle works better the more vehicles there are involved and cooperating with the network described on the basis of FIG. 1.

The presence of a central server 5 with a central database for storing the captured data or data derived therefrom which are provided by the different navigation systems 1 to 4 is not absolutely essential on the basis of the present principle. Alternatively, as FIG. 2 shows, a decentralized network 6 may be provided which couples the navigation systems 1 to 4 to one another bidirectionally. The computation power to be provided and the required memory for gathering and logically combining the data provided by the different navigation systems is advantageously distributed over the various navigation systems 1 to 4 in this case.

It is thus advantageously possible to dispense with setting up and maintaining a central server. The navigation systems 1 to 4 thus form a self-educating system which is capable of reacting to the current traffic situation, which it records itself, and of routing vehicles which are involved, which also gather information themselves, via routes with little traffic in appropriate fashion.

FIG. 3 shows an exemplary embodiment of an electronic map which, in line with the present principle, comprises road sections weighted with values which are dependent on the traffic flow.

Specifically, FIG. 3 shows a map with a starting point A, a destination B, nodes C, D, E, F and edges 15 which connect the nodes to one another. In this case, the edges 15 represent path ranges, that is to say road sections. The road sections have a respective associated value which represents the current traffic situation, that is to say the current traffic conditions on this road section. In this case, a positive numerical value corresponds to a road on which driving is easy, whereas a negative numerical value signifies poor traffic conditions, for example a queue or a closed road. The speed-dependent values, which are in a range between −5 and +5 in the present case, are assembled from a multiplicity of speed-dependent values in this case which have respectively been sent by one or more navigation systems.

In a query mode, in which the driver stipulates a starting point and a destination A, B, the navigation system can take the stored, electronic map with the subsections assessed using current traffic information as a basis for calculating and visually outputting a route which is currently most favorable in terms of traffic from the starting point A to the destination B for the driver. In this context, the frequency and currency of speed-dependent values with a high numerical value would indicate an economical path with little traffic. The data may be gathered and conditioned centrally or locally in this case, depending on the network principle used.

FIG. 4 shows a simplified block diagram of an inventive navigation system 1 for a commercial vehicle. The latter comprises an evaluation unit 7 for capturing and conditioning topographical and vehicle data, a transmission unit 8 for sending the captured data or data derived therefrom to navigation systems 2 to 4 in further vehicles, which is bidirectionally coupled to the evaluation unit 7 via a processing unit 9, a reception unit 10 for receiving data from navigation systems 2 to 4 in further vehicles, and also an output unit 11 for outputting the logically combined and conditioned data, which are coupled to the processing unit 9. In this arrangement, the processing unit 9 is designed for logically combining and conditioning the data provided by the navigation systems in further vehicles 2 to 4 or data derived therefrom. The evaluation unit 7 is coupled to a databus system in the vehicle, in the present case to a CAN-BUS, for the purpose of capturing vehicle data, such as the average speed.

Alternatively, the vehicle bus system could also be an MOST or a K-line. The evaluation unit 7 gathers the vehicle data which are relevant to the navigation system and provides them to the processing unit 9 in preprocessed form. The processing unit 9, which is in programmable form, is also coupled bidirectionally to a GPS module 12 and to a memory 13 for the purpose of position finding. In addition, a power supply unit 16 is provided which provides a supply voltage for the evaluation unit 7, the processing unit 9, the radio module 8, 10 and the memory 13. To supply it with power, the onboard power supply module 16 is connected to the vehicle battery or to the onboard power supply network. In addition, an input unit 14 for inputting a starting point A and a destination B and also further parameters and selections for the route calculation by the vehicle driver is coupled. The coupling among the individual modules is preferably bidirectional and in the form of multiconductor systems or bus systems. The display unit 11 displays the desired route and the assessment of the individual road sections on the basis of the current traffic situation, which assessment is received from and preprocessed by other navigation systems.

On the basis of starting point A and destination B, the processing unit 9 calculates the best link, in terms of time or consumption, from starting point A to destination B and takes into account further selections by the vehicle driver, for example necessary border crossings or other prescribed intermediate stations, "via stations". The transmission unit 8 sends the average vehicle speed, which is captured by the evaluation unit 7, and the current position of the vehicle, provided by the GPS system 12, to other navigation systems 2 to 4.

The navigation system described can be used for route planning which is dependent on the current volume of traffic and is automatically kept up to date at all times. In this context, the navigation system described is not limited to the congestion detection which is possible with congestion indicators in fixed locations.

Accordingly, a plurality of navigation systems of the type presented form a self-educating system together, with each navigation system benefiting from all or selected information which other navigation systems gather on a current basis.

It is within the scope of the invention that not all navigation systems in a fleet need to be equipped with the evaluation unit for capturing and conditioning data. Rather, only a subset of the vehicles in a fleet might be occupied with gathering data, whereas all of the vehicles are able to benefit from the data gathered. However, the greater the number of vehicles gathering path-dependent data, the more precisely and currently it is possible to perform traffic-volume-dependent route planning in the vehicles.

The invention claimed is:

1. A navigation system for a vehicle, comprising:
   an evaluation unit for capturing and conditioning vehicle data and/or topographical data,
   a transmission unit, which is coupled to the evaluation unit, for sending the data captured by the evaluation unit or derived therefrom to navigation systems in other vehicles,
   a reception unit for receiving vehicle data and/or topographical data or data derived therefrom from navigation systems in other vehicles,
   a processing unit which is coupled to the reception unit for the purpose of logically combining and conditioning the data provided by the navigation systems it other vehicles, and an output unit for outputting the logically combined and conditioned data, which is coupled to the processing unit, wherein the evaluation unit assigns a respective covered path range a numerical value which represents current traffic conditions over this path range, wherein a positive numerical value corresponds to a section on which driving is easy and a negative numerical value signifies poor traffic conditions.

2. The navigation system according to claim 1, wherein the vehicle data include the current or average speed of the vehicle.

3. The navigation system according to claim 1, further comprising a means for finding a position of the vehicle, wherein said means is provided and is coupled to the transmission unit for the purpose of sending the position of the vehicle.

4. The navigation system according to claim 1, further comprising an input unit provided for inputting a desired travel destination.

5. The navigation system according to claim 1, wherein the output unit comprises a graphical display.

6. The navigation system according to claim 1, wherein the vehicle is a commercial vehicle.

7. The navigation system according to claim 1, wherein the transmission unit and the reception unit are designed for satellite radio.

* * * * *